May 21, 1963  W. P. MOORE  3,090,647
AUTOMOTIVE SUSPENSION SEAT
Filed Oct. 28, 1960  3 Sheets-Sheet 2
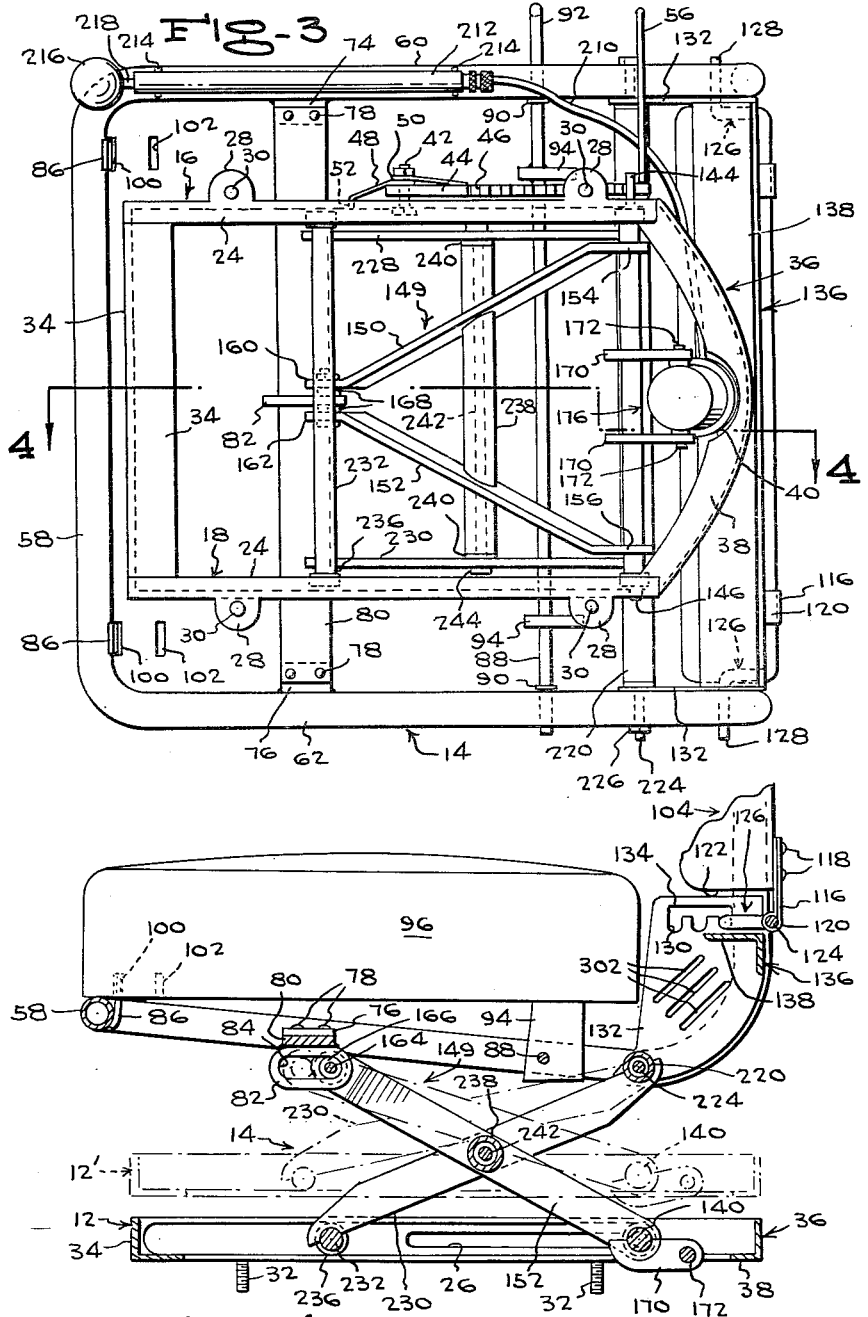
INVENTOR.
WILLIAM P. MOORE
BY
McMorrow, Berman & Davidson
ATTORNEYS

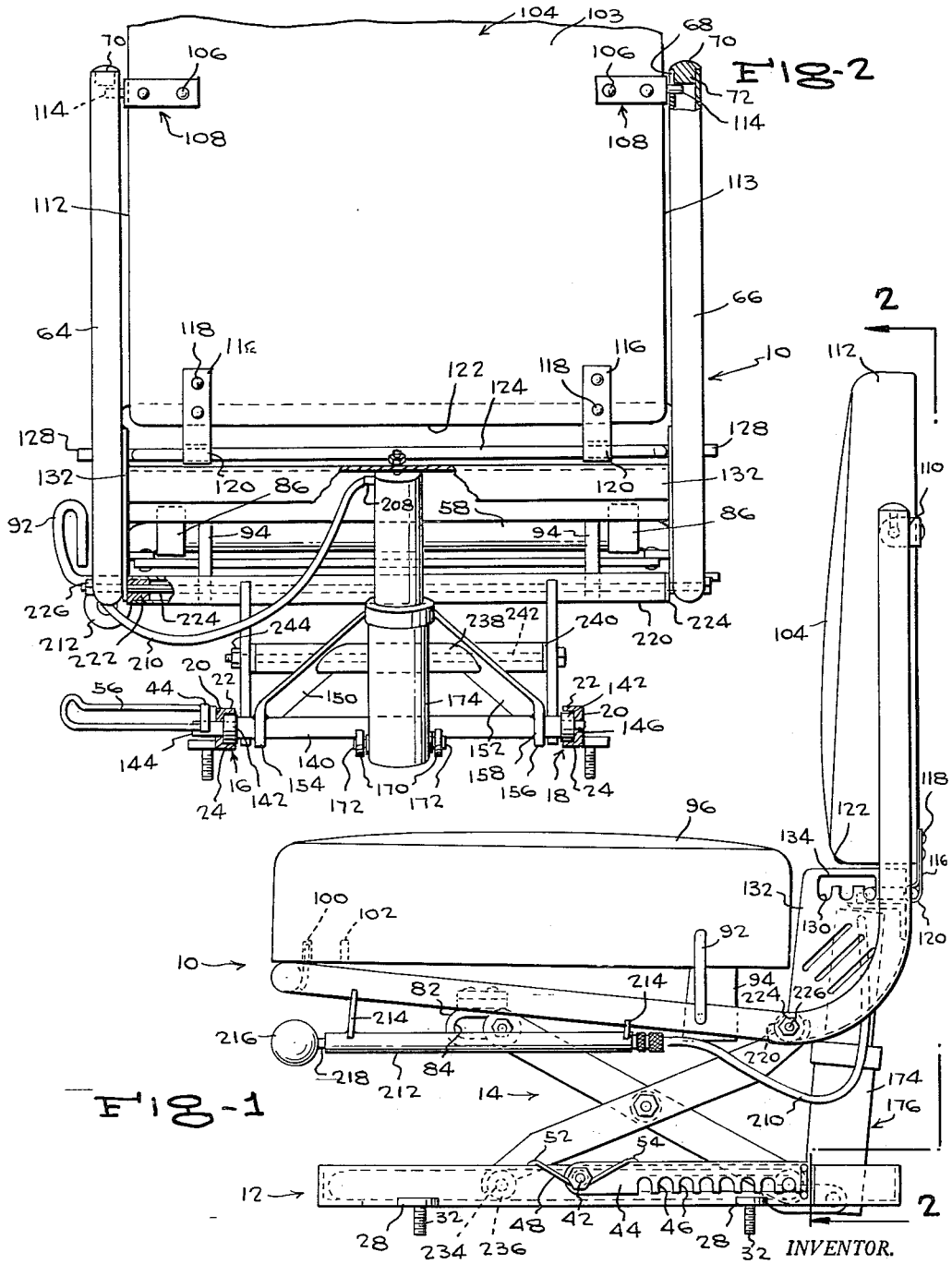

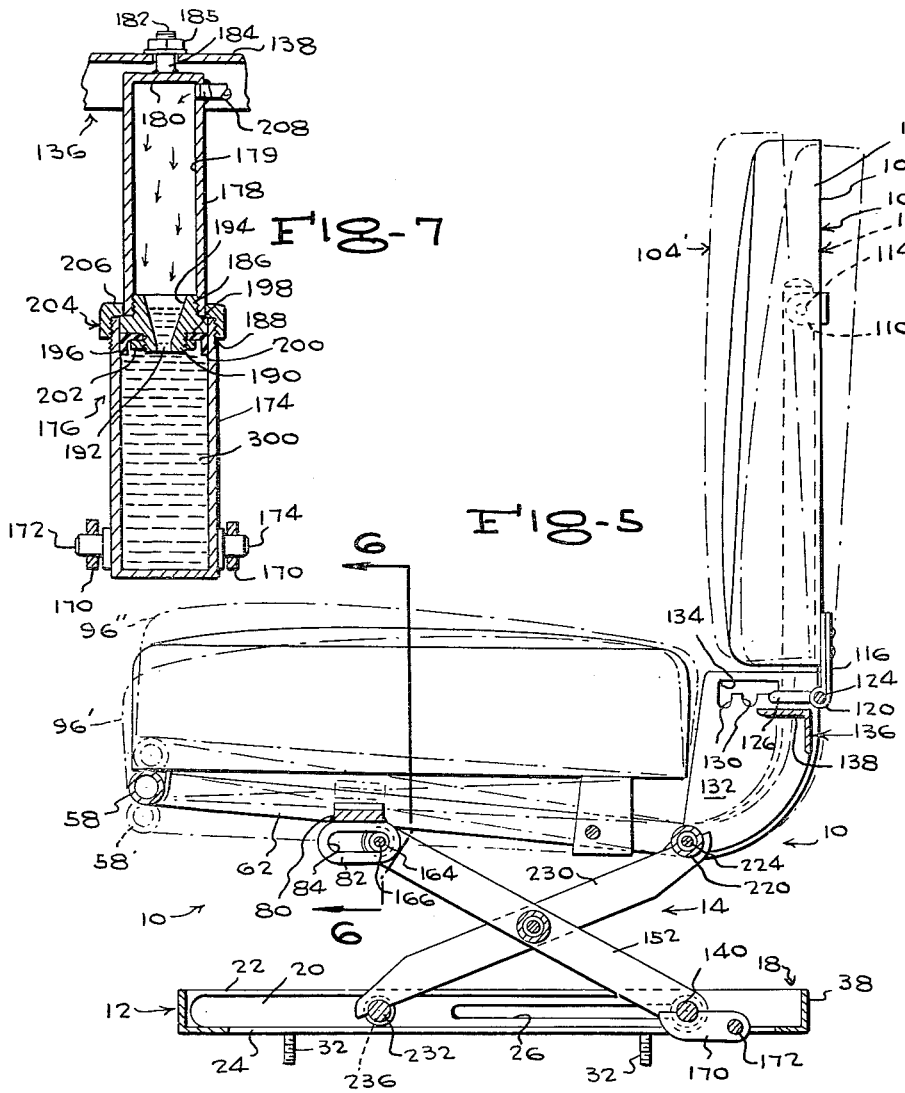
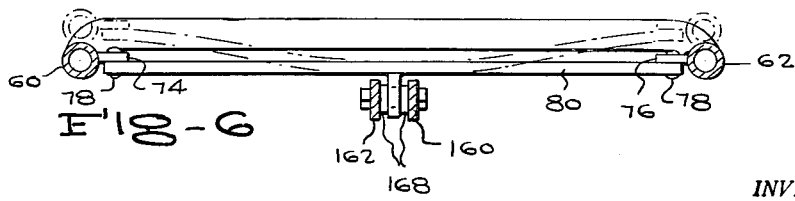

United States Patent Office 3,090,647
Patented May 21, 1963

3,090,647
AUTOMOTIVE SUSPENSION SEAT
William P. Moore, 1233 Rolleston St., Harrisburg, Pa.
Filed Oct. 28, 1960, Ser. No. 65,831
16 Claims. (Cl. 297—307)

This invention relates to suspension means for automotive vehicle seats, and more specifically, the instant invention relates to a seat suspension system or device designed for use in extremely rough-riding vehicles, such as, for example, farm tractors, busses, trucks, military vehicles, jeeps, and other types of vehicles commonly traversing rough terrain.

One of the primary objects of this invention is to provide an automotive vehicle seat suspension device or system devised to reduce and cushion vertical impacts from the vehicle against the vehicle seat and its occupants without imposing undue thrust on pivotal connections utilized to connect the seat part with the automotive vehicle.

Another object of this invention is to provide resilient means for suspending an automotive seat together with means for changing the spring rate of the resilient means to dampen the movement of the seat relative to the vehicle cab, thereby making the seat adaptable for occupants of varying weights.

A further object of this invention is to provide in an automotive seat suspension device, resilient means for effecting the vertical adjustment of the seat to suit the position of the occupant.

Still another object of this invention is to provide an automotive seat suspension device including resilient means for suspending said seat and including controlled means for dampening the resilient means to minimize the shock associated with bottoming and the rebound of the suspension mechanism.

It is a still further object of this invention to provide an automotive suspension seat with a back-slap eliminator device which will prevent forwardly and rearwardly oscillations of the automotive cab from being transmitted to the occupant of the seat through the seat back.

Still another object of this invention is to provide suspension means for an automotive seat including means for adjusting the seat forwardly and rearwardly to suit the occupant's seating position.

It is well known that suspension devices generally employed in constructions designed to accomplish objects of a similar nature, generally employ separately attached tracking and locking means for adjusting the seat forwardly and rearwardly, whereas, on the other hand, the instant invention provides means for achieving the forward and rearward adjustment of the seat through the use of forwardly and rearwardly-disposed slidable pivot points in the seat suspension mechanism, and wherein, the pivot points are selectively locked for proper seating position.

Another major object of this invention is to provide a low-level seat installation in automotive vehicles with superior riding characteristics in which is provided means for achieving the maximum vertical movement of the seat frame without interference, and wherein the suspension means for the seat absorbs objectionable jars and vibrations, and wherein the suspension device is arranged and disposed below the automotive seat.

It is a further object of this invention to provide an automotive suspension seat mechanism which is free from objectionable forwardly and rearwardly, as well as lateral movements.

Still another object of this invention is to provide manually-operable means for adjusting the seat forwardly and rearwardly, as well as vertically; and wherein the adjustable means are operable independently, one from the other.

It is well known that suspension devices generally employed in constructions designed to accomplish objects of a similar nature, are generally attached to the seat frame at four pivotal points having the pivotal points following along two parallel axes, and in which two pivotal points are aligned on each axis. In the instant invention, however, and for the ease of construction and assembly, and to assure freedom from binding at the pivotal points due to misalignment of the axes, this invention provides a mechanism which is attached to the seat frame with two pivotal points on the common axis and a third pivotal point intermediate thereof, but disposed some distance therefrom, the mechanism being referred to as a three-point seat suspension.

It is also well known that suspension devices generally employed in automotive seat suspension constructions designed to accomplish objects of a similar nature, generally employ torsion springs, and it is the further object of this invention to provide a suspension device which does not include, among the concepts thereof, the incorporation of torsion springs.

Another major object of this invention is to provide an automotive seat suspension device or mechanism which is readily adaptable and easily attached to most automotive seat frames presently being manufactured, the same being accomplished without making major alterations to the design of the conventional seat frames.

This invention has, as still another object thereof, the provision of an adjustable automotive seat suspension device or mechanism wherein manually-manipulated means are employed for adjusting the seat forwardly and rearwardly of the vehicle, as well as vertically.

Again, this invention contemplates, as a still further object thereof, the provision of means for adjusting both the automotive seat and back therefor forwardly and rearwardly as a single unit.

Still further, it is another object of this invention to provide resilient means in the nature of combined air and hydraulic means for effecting the vertical adjustment of an automotive seat, as well as providing means for dampening vertical shocks which would normally be imparted to the automotive seat in the absence of such means.

This invention has, as still another object thereof, the provision of a device, mechanism or means for suspending an automotive seat of the type generally referred to supra, the device, mechanism or means being relatively inexpensive to manufacture and assemble, and which requires but little maintenance and is durable in use.

Other and further objects and advantages of the instant invention will become more evident from a consideration of the following specification when read in conjunction with the annexed drawings, in which:

FIGURE 1 is a side elevational view of an automotive seat and the suspension means therefor constructed in accordance with this invention;

FIGURE 2 is a rear elevational view of the seat and suspension means shown in FIGURE 1, FIGURE 2 being taken substantially on the line 2—2 of FIGURE 1, looking in the direction of the arrows;

FIGURE 3 is a bottom plan view of the seat and suspension means shown in FIGURE 1;

FIGURE 4 is a cross-sectional view, partly in side elevation, FIGURE 4 being taken substantially on the line 4—4 of FIGURE 3, looking in the direction of the arrows, FIGURE 4 showing the several movements of the suspension means in response to impacts applied to the vehicle chassis;

FIGURE 5 is a cross-sectional view, partly in side elevation, and similar to FIGURE 4, FIGURE 5 illustrating the several movements of the seat and seat back in conjunction with one another to prevent back-slap;

FIGURE 6 is a detail cross-sectional view illustrating the oscillatory movement of the leaf spring and seat frame in conjunction with one another to prevent backslap; and FIGURE 7 is a detail cross-sectional view of the air-hydraulic spring and dampening means utilized in this suspension mechanism.

Referring now more specifically to the drawings, reference numeral 10 designates, in general, a suspension seat mechanism for automotive vehicles especially designed for use in rough-riding equipment, and constructed in accordance with the teachings of this invention. The suspension seat mechanism may be broadly divided into a seat base frame assembly 12 and a seat suspension assembly 14.

The seat base frame assembly 12 is seen to comprise a pair of laterally-spaced, elongated, substantially parallel U-shaped roller guide channel members 16, 18, each of identical construction and including a bight portion 20 from the longitudinally-extending marginal edge of which project a pair of spaced, substantially parallel flanges 22, 24. The roller guide channel members 16, 18 open toward each other, and the bight portion 20 of each is formed with a longitudinally-extending, elongated slot 26, the slots 26 being disposed in confronting relation relative to each other. Projecting laterally from the remotely disposed sides of the bight portions 20 are a plurality of longitudinally-spaced lugs 28 apertured at 30 (see FIGURE 3) to receive bolts 32 therethrough which are adapted to be secured to the floor of the automotive vehicle (not shown).

The channel members 16, 18, adjacent their respective forward ends, are integral with or rigidly secured to the opposed ends of an angle iron member 34, and at their respective other or rear ends, the channel members 16, 18 are rigidly secured to the opposed ends of a rearwardly-bowed angle iron 36 having a horizontal forwardly-extending flange 38 aligned with the flanges 24 and having an arcuate cut-out 40 (see FIGURE 3) at the apex thereof.

To the bight portion 20 of the channel member 16, intermediate the ends of the latter, is pivotally connected on the headed pivot pin 42 one end of an elongated, substantially flat rectangular lever 44. The other end of the lever 44 is formed with a plurality of longitudinally-spaced, downwardly-opening, slots 46 which, when the lever 44 is pivoted into juxtaposition relative to the bight 20 of the channel member 16, register with the slot 26 formed in the latter. A wire spring 48 is looped at 50 (see FIGURE 3) about the pin 42 and has a tab end 52 overlapping the flange 22 of the channel member 16, and its other end terminating in a tab end 54 (see FIGURE 1) overlapping the upper edge of the lever 44. The arrangement and tension of the spring 48 is such that the lever 44 is constantly biased for movement in a clockwise direction as viewed in FIGURE 1 of the drawings. The lever 44 has fixedly secured thereto a manually-operable U-shaped handle 56, the latter being connected adjacent the free end of the lever 44 and being operable to pivot the lever 44 about the pin 42.

The seat suspension assembly 14 includes an integral hollow tubular substantially U-shaped seat frame having a forwardly-disposed bight portion 58 from the opposed ends of which rearwardly project a pair of elongated, parallel, tubular side arms 60, 62 (see FIGURE 3) which terminate at the respective rear ends in upright tubular extensions 64, 66. The confronting sides of the extensions 64, 66 are formed, at their terminal ends, with downwardly-extending slots 68, respectively, and are provided with rounded end caps 70 having stems 72 telescoped therein. The side arms 60, 62, at points spaced inwardly from the bight portion 58, are formed with rigidly connected, inwardly-extending confronting flanges 74, 76, respectively, to which is riveted at 78 the opposite ends of a transversely-extending leaf spring 80 (see FIGURES 3, 4 and 6). Centrally of the leaf spring 80, and rigid therewith, is a depending connector 82 having an elongated slot 84 formed therein.

To the bight portion 58, adjacent each end thereof, is attached an upwardly-projecting substantially rectangular seat stop 86. The side arms 60, 62 are suitably apertured adjacent their respective rear ends to rotatably support and journal for rotation therein a transversely-extending shaft 88 having thrust washers 90 fixedly secured thereto adjacent the confronting sides of the side arms 60, 62. As is seen in the drawings, one end of the shaft 88 terminates in a manually-operable handle 92. Mounted for rotation with the shaft 88, and proximate to, but spaced from the side arms 60, 62 are a pair of feet support plates 94 having, essentially, a trapezoidal configuration. As is seen clearly in FIGURE 4, the shaft 88 extends transversely through the plates 94 adjacent the corner thereof whereby successive edges of the plates 94 may be presented uppermost.

Reference numeral 96 denotes a seat having a substantially rectangular configuration and of conventional construction with the exception of the provision of pairs of slots 100, 102 in the underside thereof at its forward end and adjacent each of its respective sides. The slots 100 or 102 are adapted to selectively receive therein, respectively, the seat stops 86 whereby the seat 96 may be moved forwardly or rearwardly, as desired, and held in its selected adjusted position.

To the rear side 103 of the seat back 104, adjacent its upper end and at each side thereof is secured, by rivets 106, an L-shaped bracket 108 having its foot portion 110 extending around the sides 112, 113 of the seat back 104, each foot portion 110 having a pivot pin 114 disposed in alignment and projecting away from each other for pivotal engagement within the slots 68. The stems 72 of the caps 70 engage against the pins 114 to prevent vertical displacement thereof and consequently, of the seat back 104.

A pair of straps 116 are fixedly secured to the rear side 103 of the seat back 104 by rivets 118, the straps 116 being disposed, respectively, adjacent each of the sides 112, 113 and include tubular sleeves 120 which depend below the underside 122 of the seat back 104. The sleeves 120 pivotally receive therein a transversely-extending shaft 124, the opposed ends of which terminate in cranks 126 having outwardly-turned crank arms 128. The crank arms 128 at each end of the shaft 124 are selectively engaged within one of a plurality of slots 130 formed in a pair of side plates 132 fixedly secured, respectively, to the side arms 60, 62 and their respective upright extensions 64, 66, and to the lines of junction or corners therebetween. The slots 130 open, at their upper ends, into a comomn slot 134. This construction provides pivotal adjustment of the seat back 104 about the pivot pins 114.

Fixedly secured to and extending between the upright extensions 64, 66 immediately below the slots 130 is an angle member 136 having a normally horizontal, inwardly-extending flange 138 to which further reference will be made.

Extending transversely between the guide channel members 16, 18 is a shaft 140 on each end of which is mounted, for free rotation, a roller 142, the rollers being adapted to reciprocate within the guide channel members 16, 18. The shaft 140, at its terminal end, is reduced in diameter to form stub shafts 144, 146 which project beyond the remote sides of the rollers 142 and extend through the slot 26. As is seen in FIGURES 2 and 3, the stub shaft 144 is of such length as to project beyond the lever 44 whereby the stub shaft 144 may be received and held captive within a selected one of the slots 46. The length of the slots 26 determines, of course, the degree of movement of the shaft 140 relative to the guide channel members 16, 18.

Reference numeral 149 indicates, in general, a yoke assembly including a pair of flat, substantially rectangular arms 150, 152 having offset, substantially parallel ends 154, 156, respectively, which are suitably apertured to receive the shaft 140 therethrough. Weld or other conventional means 158 secure the ends 154, 156 with the shaft 140.

The arms 150, 152 converge upwardly from the shaft 140, and the other ends thereof are again offset at 160, 162, respectively, and are disposed in close proximity to the link 82 on opposite sides thereof. A roller shaft 164 extends through the slot 84 and has its opposed ends supported on and secured to the ends 160, 162. Freely mounted for rotation on the roller shaft 164 is a roller 166 which loosely engages within the slot 84 of the connector 82. Washers 168 are mounted on the roller shaft 164 and are interposed between adjacent sides of the arm ends 160, 162 and the link 82.

Intermediate the ends of the shaft 140, and welded or otherwise secured thereto, are one of the ends of a pair of axially-spaced, substantially rectangular support plates 170, the plates 170 projecting rearwardly from the shaft 140 and having their respective ends connected to pins 172 which project from diametrically-opposed sides of a hollow cylindrical casing 174 of an air-operated hydraulic spring 176. In the construction shown, it will be understood that the spring 176 is pivotally connected through the pins 172 on the plates 170, and that the casing 174 projects through the arcuate cut-out 40 formed in the flange 38 of the bowed angle iron 36 (see FIGURE 3). The spring 176 includes an elongated cylindrical piston 178 having an end wall 180 extending across the upper end thereof and having rigidly secured thereto a centrally-located stud bolt 182 which projects through an aperture 184 formed in the flange 138. Nut 185 maintains the connection of the bolt 182 with the flange 138 (see FIGURE 7). The piston 178 has the lower end thereof internally threaded to receive the upper end of an externally threaded plug 186. The plug 186 has a circumferential flange 188 which telescopically engages the inner side of the casing 174. The plug 186 is also integral with a depending neck 190 externally threaded and having a central bore 192 extending axially therethrough and in open communication at its inner end with an inverted frusto-conical passage 194 which extends coaxially with the plug 186. The bore 192 connects with the passage 194 substantially at the plane of the frustom. A substantially cylindrical sealing ring 196 is provided with a centrally apertured end wall 198 which receives the neck 190 therethrough, and a depending cylindrical side wall 200 which slidably engages the inner side of the casing 174. The end wall 198 is releasably clamped on the plug 186 between the flange 188 and the nut 202 threaded on the neck 190.

A cap 204 is threadedly connected on the upper end of the casing 174 and has an end wall 206 centrally apertured to reciprocably receive the piston 178 therethrough and serves as an overhanging abutment to limit the relative movement of the piston 178 relative to the casing 174.

The upper end of the piston 178 is connected through a fitting 208 and flexible tubing 210 with the conventional air pump 212. The pump 212 is substantially cylindrical in configuration and is subtended from a side arm 60 by means of a pair of bracket plates 214, and is manually operable by means of a spherical knob 216 connected to one end of a reciprocable piston rod 218, the other end of the rod 218 being connected to the conventional piston, not shown.

Extending transversely between the inner or rear ends of the side arms 60, 62 is a hollow tubular element 220 having centrally bored thrust plugs 222 (see FIGURE 2) inserted within each end thereof. As is seen in the drawings, the plugs 222 are juxtaposed with respect to the side plates 132, and an elongated bolt 224 extends through the arms 60, 62, the side plates 132, the plugs 222 and axially through the tubular element 220. The bolt 224 is held against axial displacement by a nut 226. A pair of substantially flat levers 228, 230 have one of their ends connected, respectively, to each end of the tube member 220 adjacent each end of the latter. The levers 228, 230 extend forwardly and downwardly from the tubular member 220 and their respective other ends are connected adjacent the opposed ends of a shaft 232 that extends transversely between the guide channel members 16, 18. The shaft 232, at the remotely-disposed ends thereof, terminates in reduced stub axles 234 (see FIGURE 1) on which are mounted for free rotation, rollers 236. The rollers 236 are seen engaged within and track the guide channel members 16, 18 forwardly of their respective slots 26.

The arms 150, 152 and their immediately adjacent levers 228, 230, are interconnected in an X type configuration by means of a transversely-extending hollow tubular member 238 which extends through the arms 150, 152, transversely of the side arms 60, 62, the opposed ends of the hollow tubular element 238 abutting against thrust plugs 240 which, in turn, bear against the adjacent sides of the levers 228, 230. As is clearly seen in FIGURES 3 and 4, the hollow tubular element 238 is secured in position by means of an elongated bolt 242 which extends through the hollow tubular element 238 and the thrust plugs 240, concentrically therewith, and through and beyond the remotely-disposed sides of the levers 228 and 230. Lateral displacement of the shaft is prevented by nut 244.

It is believed from the foregoing description that the action of the several components of this invention is self-evident. However, and by way of a brief summary, the following statements as to the operation of the device may prove helpful to the reader.

Referring now more specifically to FIGURE 1 of the drawings, the suspension device, including the seat 96 and the seat back 104, is shown in the rearmost position, and the piston 178 is shown in its utmost extended position in an upward direction. To adjust the seat 96 and the seat back 104 forwardly, it is only necessary for the occupant to grasp the handle 56 and pull the same upwardly to elevate the lever 44 whereby the seat 96 and seat back 104 may be moved forwardly riding on the rollers 142, 236. Thereafter, the lever 44 may be released to effect engagement of one of the slots 46 thereof over the stub shaft 144, whereby the shaft 140 is held captive and stationary against any forward or rearward movement.

The angularity of the seat back 104 may be adjusted, as explained above, through the manipulation of the crank arms 128, elevating the same for movement in the slot 134 for selective engagement with any one of the slots 130 which communicate therewith. The pivotal movement of the seat back 104 takes place, of course, about the pivot pins 114.

Referring to FIGURE 1 of the drawings, the seat 96 is shown in the rearmost position on the seat frame members 58, 60, 62. To adjust the seat forwardly relative to the seat frame, it is only necessary to lift the front portion of the seat 96 until the slots 100 clear the stops 86, and then to move the seat 96 forwardly until the stops 86 are aligned for engagement with the slots 102, whereupon the seat 96 is lowered to effect the new engagement of the stops 86 with the slots 102.

The horizontal angularity of the seat 96 is adjustable by manually rotating handle 92, so that successive edges of the plates 94 may be presented uppermost to support the seat 96. Under these circumstances, pivotal movement of the seat 96 takes place, of course, about the stops 86 and the selected one of the pairs of slots 100 or 102.

Now, let us assume that the seat 96 is occupied and the back of the occupant rests against the seat back 104. Under these circumstances, the seat 96 will move vertically downwardly relative to the seat base 12, carrying with it the piston 178 which telescopes into the cylinder 174, and under these circumstances the hydraulic fluid 300 will flow through the orifice 192, into the cavity 179 of the piston 178. The hydraulic fluid 300 compresses the air ahead of it and which is entrapped in the cavity 179, and vertical movement of the piston 178 will cease when the force exerted vertically and upwardly, as viewed in FIGURE 7, on the compressed air is in equilibrium with the force exerted inwardly or downwardly, reference again being made to FIGURE 7, on the piston 178 by the weight of the occupant, plus the seat and seat suspension means weight acting through the flange 138.

To adjust the vertical height of the seat 96 relative to the seat base 12, it is only necessary for the occupant to grasp the knob 216 of the air pump 212, and by reciprocating motion of the knob 216 air is forced into the cavity 179 of the piston 178, raising the seat to suit the occupant's position and causing equilibrium between the compressed air and the hydraulic fluid 300.

Now that the seat 96 is occupied, and that the occupant of the seat has his back resting against the seat back 104, and that the several aforementioned adjustments have been made to accommodate the occupant, the seat 96 will be at a vertical equilibrium height somewhere between the maximum vertical extension of the piston 178 and its lowermost position, with the several component elements of the suspension device shown approximately in full lines in FIGURE 4 of the drawings. If the automotive vehicle, to which the seat 96 is connected, should sustain an impact, causing the chassis thereof to move upwardly, the seat base frame assembly 12 will move in the same direction and will move upwardly from the fullline position shown in FIGURE 4 to some position, such as, for example, the dotted-line position 12' also shown in FIGURE 4. This is due to the fact that under the influence of inertia the occupant and the seat 96 tend to retain their original position and the seat base will, therefore, move upwardly, and the roller 166 will move forwardly within its associated slot 84 of the connector 82. Simultaneously, the levers 228, 230 will pivot to their dotted-line position as is shown, for example, in FIGURE 4, and with respect to the levers 228, 230 the rollers 236 will move forwardly within their guide channel members 16, 18. Simultaneously, the yoke 149 will pivot to its dotted-line position, as is shown in FIGURE 4, and it follows that the hydraulic cylinder casing 174, simultaneously, will telescope upwardly over the hydraulic piston 178.

On the other hand, and assuming that the vehicle drops into a pit, rut, or other type of depression, the seal 96 and the seat back 104 will tend to remain in their fullline positions as shown in FIGURE 4, under the force of inertia, while the seat base assembly 12 will drop below the full-line position shown in FIGURE 4. The seat 96 tends to retain its full-line position through the influence of the combined air-hydraulic piston means 176 which exercises its influence through the flange 138 to retain the seat 96 and its suspension means in its original absolute position. Of course, as the chassis of the vehicle rises and lowers in response to crests and depressions in the road, the rollers 236 will ride forwardly and rearwardly within their associated channel members.

The combined air-hydraulic spring 176, due to the venturi effect of the frusto-conical passage 194 and the restricted throat 192, provides an air cushion whereby the air over the hydraulic fluid 300, disposed within the casing 174, may be compressed under downward depression of the seat 96 and the piston 178 as it descends within the casing 174, and receives therein the hydraulic fluid 300 at a restricted rate to prevent rapid bottoming of the piston. However, when normalcy is gained by the vehicle, the compressed air within the piston 178 reasserts its pressure on the hydraulic fluid 300, causing the same to return to the casing 174 at a somewhat restricted rate, whereby the seat 96 is more gradually returned to its equilibrium position without danger of the piston 178 rebounding against its outwardly-extending stop 206.

Now, assuming that the vehicle sustains an impact that causes the chassis thereof to pitch forwardly and rearwardly, the seat base assembly 12 will move in a forward and backward direction which normally would tend to transmit this impact to the seat back 104 with the resultant slapping of the back of the seat occupant by the seat back 104; however, as illustrated in FIGURE 5 of the drawings, the substantially U-shaped seat frame 58, 60, 62, 64 and 66 is pivoted about the shaft 224 and is restrained from free pivotal movement about the shaft only by the resilient leaf spring 80 which is attached to the seat frame at 74 and 76. Much of the energy ordinarily consumed by the seat back 104 slapping the occupant's back is, in this embodiment of my invention, absorbed by deflections of the resilient spring 80, as shown in FIGURE 6 of the drawings, thereby allowing the seat back to more closely stay in constant contact with the occupant's back.

Having illustrated and described one embodiment of this invention in detail, it will be understood that the same is offered merely by way of example, and that this invention is to be limited only by the scope of the appended claims.

What is claimed is:

1. A suspension device for an automotive vehicle seat comprising a base frame including a pair of laterally-spaced, elongated, substantially parallel guide members adapted to be secured to the floor of said vehicle, a pair of shafts having their respective ends mounted on said guide members, means securing one of said shafts against movement relative to said guide members, the other of said pair of shafts being free to move longitudinally of said guide members, a U-shaped seat frame including a pair of laterally-spaced side arms, a shaft extending transversely between said side arms adjacent the outer ends thereof, a pair of levers disposed, respectively, adjacent each of said side arms of said seat frame and connecting at one of their respective adjacent ends with said last-named shaft and at their respective other adjacent pair of ends with the other of said pair of shafts, a yoke having a pair of side arms, means connecting said last-named side arms with said seat frame intermediate said side arms of said seat frame, the other ends of said side arms of said yoke connecting with said one shaft of said pair of shafts, and resilient means connected with and extending between said base and seat frames, said resilient means constantly biasing said seat frame for movement away from said base frame.

2. A suspension device for an automotive vehicle seat comprising a base frame including a pair of laterally-spaced, elongated, substantially parallel guide members adapted to be secured to the floor of said vehicle, a pair of shafts having their respective ends mounted on said guide members, means securing one of said shafts against movement relative to said guide members, the other of said pair of shafts being free to move longitudinally of said guide members, a substantially U-shaped seat frame including a pair of laterally-spaced side arms, a shaft extending transversely between said side arms adjacent the outer ends thereof, a pair of levers disposed, respectively, adjacent each of said side arms and connecting at one of their respective adjacent ends with said last-named shaft and at their respective other adjacent pair of ends with the other of said pair of shafts, a leaf spring extending transversely between and fixedly connected to said side arms of said seat frame intermediate their respective ends, a yoke having a pair of side arms, means connecting one pair of adjacent ends of said last-named side arms with said seat frame, the other ends of said last-named side arms of said yoke connecting with said one shaft of said pair of shafts, and resilient means connected with and extending between said base and seat frames, said resilient means constantly biasing said seat frame for movement away from said base frame.

3. A suspension device for an automotive vehicle seat comprising a base frame including a pair of laterally-spaced, elongated, substantially parallel channel-shaped guide members adapted to be secured to the floor of said vehicle, said channel-shaped guide members opening toward one another, a pair of shafts each having roller means mounted on the respective ends, said roller means being received within said channel-shaped guide members for movement longitudinally thereof, means adjustably securing one of said shafts in a preselected position relative to said guide members, the other of said shafts being free to move longitudinally of said guide members, a U-shaped seat frame including a pair of laterally-spaced side arms, a shaft extending transversely between said side arms and supported thereon adjacent the outer ends thereof, a pair of levers disposed, respectively, adjacent each of said side arms of said U-shaped seat frame and connecting at one of their respective adjacent ends with said last-named shaft and at their respective other adjacent pair of ends with the other of said pair of shafts, a leaf spring extending transversely between said side arms of said U-shaped seat frame and fixedly secured thereto, a slotted connector fixedly secured to and depending from said leaf spring, a yoke having a pair of side arms, one adjacent pair of ends of said side arms of said yoke being disposed on opposite sides of said connector, a roller disposed within said link and movable relative thereto, means securing said ends of said side arms on said yoke with said roller, the other respective ends of said yoke being connected with said one shaft of said pair of shafts, and resilient means connected with said base and seat frames, said resilient means constantly biasing said seat frame for movement away from said base frame.

4. A suspension device for an automotive vehicle comprising a base frame including a pair of laterally-spaced, elongated, substantially parallel guide members adapted to be secured to the floor of said vehicle, said guide members each having a substantially U-shaped guide channel configuration and opening toward each other, said guide members each having an elongated longitudinally-extending slot formed therein and disposed in registry, one with the other, a pair of shafts, each of said shafts having rollers mounted on their respective ends and freely rotatable thereabout, said rollers being adapted to be received within said U-shaped guide members, one of said shafts having its opposed ends reduced in diameter and receivable within said slots, a lever pivotally secured on one of said U-shaped guide members and movable into a position across one of said slots, said lever having a plurality of longitudinally-spaced downwardly-opening notches formed therein adapted to selectively receive one of the ends of said shaft having a reduced diameter, whereby said one shaft may be held in a selected position relative to said U-shaped guide members, the other of said shafts being free to move longitudinally of said U-shaped guide members, a U-shaped seat frame including a pair of laterally-spaced side arms, a shaft extending transversely between said side arms adjacent the outer ends thereof, a pair of levers disposed, respectively, adjacent each of said side arms and connecting at one of their respective adjacent ends with said last-named shaft and at their other respective adjacent pair of ends with the other of said pair of shafts, a yoke having a pair of side arms, means connecting said side arms with said seat frame intermediate said seat frame side arms, the other ends of said side arms of said yoke connecting with said one shaft of said pair of shafts, and resilient means connected with and extending between said base and said seat frames, said resilient means constantly biasing said seat frame for movement away from said base frame.

5. A suspension device for an automotive vehicle seat comprising a pair of laterally-spaced, elongated, substantially parallel U-shaped guide members adapted to be secured to the floor of said vehicle with said guide members opening toward each other, said guide members, adjacent one of their respective adjacent ends each having a longitudinally-extending slot formed therein with said slots being disposed in confronting relation relative to each other, a pair of shafts each having a roller freely mounted on the opposed ends thereof, said rollers being engageable within said guide members and movable longitudinally thereof, one of said rollers having reduced end portions forming stub shafts extendable through and beyond the remotely disposed sides of said slots, a lever pivotally mounted on one of said U-shaped guide members and movable across one of said slots, said lever having a plurality of downwardly-opening slots formed therein to selectively receive one of said stub shafts therein, a substantially U-shaped seat frame including a pair of substantially parallel, laterally-spaced side arms, a shaft extending transversely between and supported on said last-named pair of side arms adjacent the outer ends thereof, a leaf spring extending transversely between and fixedly secured to said side arms intermediate the ends thereof, a slotted connector fixedly secured to and depending from said leaf spring, a pair of levers disposed, respectively, adjacent each of said side arms of said seat frame, said levers having a pair of adjacent ends connected with said last-named shaft, and their other pair of adjacent ends connected with the other of said pair of rollers, a yoke assembly including a pair of side arms, one of the adjacent pairs of ends of said side arms terminating in proximity to said connector and disposed on opposite sides thereof, a roller mounted on said ends of said side arms of said yoke and engaging within said link, the other adjacent ends of said side arms of said yoke connecting with said one shaft of said pair of shafts, and resilient means interposed between said base frame and said seat frame, said resilient means constantly biasing said seat frame for movement away from said base frame.

6. A seat for an automotive vehicle, said seat comprising a substantially U-shaped seat frame, said seat frame including a pair of substantially parallel side arms connecting at their respective outer ends with a pair of substantially upright members, a pair of plates fixedly secured, respectively, to said side arms and said upright members and to the junction thereof, said plates being disposed in parallel relation relative to one another, each of said plates having a horizontally-extending groove formed therein and a plurality of vertically-extending slots communicating with said groove, a seat back pivotally connected adjacent its upper end on said upright members, a shaft pivotally supported on said seat back adjacent the lower end thereof, said shaft terminating in crank arms adapted to be selectively received in a pair of opposed slots whereby said seat back may be pivoted to a selected adjusted position, said seat frame including a bight portion connecting the other ends of said side arms, a seat supported on said bight portion, and means connected to said side arms for adjusting and supporting said seat thereon.

7. A seat frame for an automotive vehicle seat, said seat frame comprising a substantially U-shaped element having a bight portion from the opposed ends of which project, in spaced parallel relation, a pair of side arms, said side arms at their respective outer ends terminating in upright extensions, a seat back pivotally supported adjacent its upper end on the upper ends of said extensions, said seat back, adjacent its lower end, having fixedly secured thereto in laterally-spaced relation a pair of tubular brackets, said side arms and said extensions having fixedly secured thereto and to their junction, a pair of bracket plates, respectively, each of said bracket plates having a normally horizontal slot extending transversely therethrough, said plates also having a plurality of normally downwardly-extending slots disposed in spaced relation relative to each other and in communication with said first slot, said tubular brackets having mounted therein a shaft terminating at its respective outer ends in crank arms, said crank arms being adapted to be received, selectively, within a selected one of said last-named slots, a second shaft pivotally supported on and extending between said side arms, said second shaft being fixedly secured to a substantially trapezoidal plate disposed adjacent each of said side arms, handle means for effecting rotation of said last-named shaft, said last-named shaft being extended through a corner of said trapezoidal plates whereby selective edges of said plates may be presented uppermost, a substantially rectangular seat supported on said plates and on said bight portion of said frame, means on said bight portion of said frame coacting with means formed on said seat to retain said seat in longitudinally-adjusted relation with respect to said side arms, a leaf spring extending between and fixedly secured to said side arms intermediate their respective ends, a slotted connector fixedly secured to and depending from said leaf spring intermediate its respective ends, a roller disposed for movement within said connector, a shaft fixedly secured to said base frame, a third shaft mounted for movement on said base frame, a yoke including a pair of side arms having a pair of adjacent ends disposed upon opposite sides on said connector, means connecting said roller with said ends of said side arms, the other ends of said side arms connecting with the second of said shafts, a second shaft extending between said side arms adjacent the outer ends thereof, a pair of levers, said levers being disposed each, respectively, adjacent one of said side arms of said seat frame, one adjacent pair of ends of said levers connecting with said last-named shaft and the other pair of adjacent ends of said levers engaging the third of said shafts, and means extending transversely through said side arms of said yoke and said levers intermediate the length thereof.

8. An automotive seat suspension device for an automotive vehicle, said device comprising a pair of substantially U-shaped channel guide members, said members being disposed in confronting relation relative to each other and opening toward each other, means for fixedly securing said guide members to the floor of said vehicle, each of said guide members including an elongated substantially rectangular slot formed in the bight portions thereof, said slots being disposed in registry, one with the other, said slots being disposed adjacent one end of each of said channel members, an elongated lever having one of its ends pivotally connected to said bights of said channel guide members, said lever being adapted to extend across one of said slots, said lever having a plurality of downwardly-opening slots formed therein, a pair of shafts extending transversely between said channel-shaped guide members, each of said shafts having a roller freely mounted for rotation on each end thereof and engageable within said channel-shaped guide members, one of said shafts having reduced ends extensible through said slots formed in said bight portions of said guide members, one of said extended ends being adapted to be selectively engaged within one of said slots formed in said lever, resilient means connected between said lever and its associated channel guide member, said resilient means constantly tending to bias said lever for movement over said reduced end portions of said one shaft, a substantially U-shaped hollow tubular seat supporting member, said seat supporting member including a bight portion from the ends of which project a pair of hollow tubular side arms, the outer ends of said side arms terminating in upright extensions, a seat supported on said bight and said side arms, means on said bight portion cooperating with means on said seat to lock said seat in adjusted position relative to said bight portion, means supported on said side arms for adjustably supporting said seat above said side arms, a leaf spring extending transversely between and being supported on said side arms intermediate said respective ends, a slotted connector fixedly secured to and depending from said leaf springs intermediate its ends, a hollow tubular element extending transversely between said side arms adjacent their respective ends, a pair of levers disposed, respectively, adjacent each of said side arms, said levers having a pair of their respective adjacent ends connected to said hollow tubular member and their other respective adjacent ends connected with the other of said pair of shafts, a yoke including a pair of side arms, said yoke having a pair of adjacent ends terminating in offset portions disposed on opposite sides of said connector, a roller disposed within said link, a shaft supported on said offset ends, the other ends of said side arms of said yoke having offset ends fixedly secured to said one of said pair of shafts, a substantially hollow tubular member extending between said side arms of said seat frame adjacent the outer ends thereof, a pair of levers, said levers being disposed, respectively, adjacent each of said hollow tubular side arms of said seat frame, said levers, adjacent one of their respective adjacent ends connecting with said last-named hollow tubular member and the other ends connecting with the other of said pair of shafts, a plate fixedly secured to said side arms of said seat supporting member and to its upright extensions, each of said plates having a normally horizontal slot extending transversely therethrough, each of said plates also having a plurality of normally vertically-extending slots extending transversely therethrough and in open communication with said last-named slot, a seat back supported on said extensions, said back including a pair of laterally-spaced brackets having pivot pins projecting laterally therefrom in diverging directions, said pins being pivotally supported in the upper ends of said extensions, a pair of substantially hollow tubular journals depending from the lower end of said seat back, a shaft journaled for rotation within said brackets and having its opposed ends terminating in crank arms, said crank arms being adapted to be selectively engaged within said last-mentioned slots, and a piston connected between said guide members and said tubular seat supporting member, said piston being of the air-operated hydraulic type.

9. A suspension device for an automotive vehicle seat comprising a base frame including a pair of laterally-spaced, elongated, substantially parallel guide members adapted to be secured to the floor of said vehicle, a pair of shafts having their respective ends mounted on said guide members, means securing one of said shafts against movement relative to said guide members, the other of said pair of shafts being free to move longitudinally of said guide members, a U-shaped seat frame including a pair of laterally-spaced side arms, a member extending transversely between said side arms adjacent the outer ends thereof, a pair of levers disposed, respectively, adjacent each of said side arms of said seat frame and connecting at one of their respective adjacent ends with said last-named member and at their respective other adjacent pair of ends with the other of said pair of shafts, a yoke having a pair of side arms, means connecting one adjacent pair of ends of said last-named side arms of said yoke with said seat frame intermediate said side arms of said seat frame, the other adjacent pair of ends of said side arms of said yoke connecting with said one shaft of said pair of shafts, and resilient means connected with and extending between said base and seat frames, said resilient means constantly biasing said seat frame for movement away from said base frame.

10. A suspension device for an automotive vehicle seat comprising a base frame including a pair of laterally-spaced, elongated, substantially parallel guide members adapted to be secured to the floor of said vehicle, a pair of shafts having their respective ends mounted on said guide members, means securing one of said shafts against relative movement with respect to said guide members, the other of said pair of shafts being free to move longitudinally of said guide members, a U-shaped seat frame including a pair of laterally-spaced side arms, a tubular member extending transversely between said side arms adjacent the outer ends thereof, a pair of levers disposed, respectively, adjacent each of said side arms of said seat frame and connecting at one of their respective adjacent ends with said last-named tubular member and at their respective other adjacent pair of ends with the other of said shafts, a yoke having a pair of side arms, means connecting one adjacent pair of ends of said last-named side arms of said yoke with said seat frame intermediate said side arms of said seat frame, the other adjacent pair of ends of said side arms of said yoke connecting with said one shaft of said pair of shafts, and resilient means connected with and extending between said base and seat frames, said resilient means constantly biasing said seat frame for movement away from said base frame.

11. A suspension device for an automotive vehicle seat comprising a base frame including a pair of laterally-spaced, elongated, substantially parallel guide members adapted to be secured to the floor of said vehicle, a seat frame including a pair of laterally-spaced and substantially parallel side arms extending substantially parallel to said guide members, resilient means extending between said side arms and connected thereto intermediate their respective ends, a first means extending between and slidably mounted on side guide members, a second means extending between and mounted for selective adjustment relative to the longitudinal axis of said guide members, a third means extending between and fixedly secured to said side arms of said seat frame, a pair of levers extending between and connected with said first and third means, a yoke having a pair of side arms, means connecting a pair of adjacent ends of said side arms of said yoke with said resilient means, means connecting the other pair of adjacent ends of said side arms of said yoke with said second means, and means extending through said side arms of said yoke and through said levers connecting the same together for simultaneous movement.

12. A suspension device as defined in claim 10 wherein said seat frame side arms terminate in normally vertical upright extensions to support a seat back thereon and therebetween, and resilient means connected between said extensions and said second means.

13. A suspension device as defined in claim 12 wherein said means connecting said resilient means with said pair of ends of said side arms of said yoke are loose to form a sliding connection therebetween.

14. A suspension device as defined in claim 13 wherein said ends of said side arms of said yoke are connected to said second means and said resilient means for pivotal movement relative to said seat frame and said guide members, and said levers are connected to said first and third means for pivotal movement between said seat frame and said guide members.

15. A suspension device as defined in claim 14 wherein said resilient means extending between said extensions and said second means includes a pivotal connection.

16. A seat suspension device for a vehicle comprising a seat frame for said seat, said frame including a pair of laterally-spaced normally parallel side frame members, each of said frame members terminating in an upright extension, a seat back pivotally connected to said extensions adjacent their respective upper ends, means connecting the lower end of said seat back in a pivoted preselected position, a rigid member extending between and connected to said side frame members intermediate the ends thereof, a base frame for said suspension device, said suspension device including means pivotal and slidable relative to said seat and base frames, said last-named means extending between and connected with said frame members and said base frame, and resilient means extending between and connected to said extensions of said frame members and said base frame.

References Cited in the file of this patent
UNITED STATES PATENTS

| | | |
|---|---|---|
| 848,465 | Homeyer | Mar. 26, 1907 |
| 1,708,632 | Podiebrad | Apr. 9, 1929 |
| 2,146,520 | Zimtbaum | Feb. 7, 1939 |
| 2,432,554 | Knoedler | Dec. 16, 1947 |
| 2,598,421 | Page | May 27, 1952 |
| 2,636,544 | Hickman | Apr. 28, 1953 |
| 2,690,786 | Sedlock | Oct. 5, 1954 |
| 2,770,288 | Peyton | Nov. 13, 1956 |
| 2,954,223 | Lucien | Sept. 17, 1960 |
| 2,959,410 | Fullam | Nov. 8, 1960 |